(12) United States Patent
Franke

(10) Patent No.: US 9,267,569 B2
(45) Date of Patent: Feb. 23, 2016

(54) PLANETARY TORSIONAL DAMPER SYSTEM

(75) Inventor: Brian William Franke, Hamilton, IN (US)

(73) Assignee: EATON CORPORATION, Cleveland, OH (US)

(*) Notice: Subject to any disclaimer, the term of this patent is extended or adjusted under 35 U.S.C. 154(b) by 719 days.

(21) Appl. No.: 13/398,108

(22) Filed: Feb. 16, 2012

(65) Prior Publication Data
US 2013/0213761 A1    Aug. 22, 2013

(51) Int. Cl.
*F16F 15/121*    (2006.01)
*F16F 15/12*    (2006.01)

(52) U.S. Cl.
CPC .................. *F16F 15/1206* (2013.01)

(58) Field of Classification Search
None
See application file for complete search history.

(56) References Cited

U.S. PATENT DOCUMENTS

| | | |
|---|---|---|
| 4,365,525 A | 12/1982 | Imazaike |
| 6,126,568 A | 10/2000 | Sudau |
| 6,974,401 B2 | 12/2005 | O'Leary et al. |
| 7,635,056 B2 | 12/2009 | Orlamunder et al. |
| 2008/0220927 A1 | 9/2008 | Maucher et al. |

*Primary Examiner* — Erin D Bishop
(74) *Attorney, Agent, or Firm* — Warn Partners, P.C.

(57) ABSTRACT

A planetary gear damper is provided having a ring gear, a plurality of planet gears meshed with the ring gear, and a sun gear meshed with the planet gears. The planetary gear damper provides for torsional damping which has long travel and provides low rate damping.

21 Claims, 11 Drawing Sheets

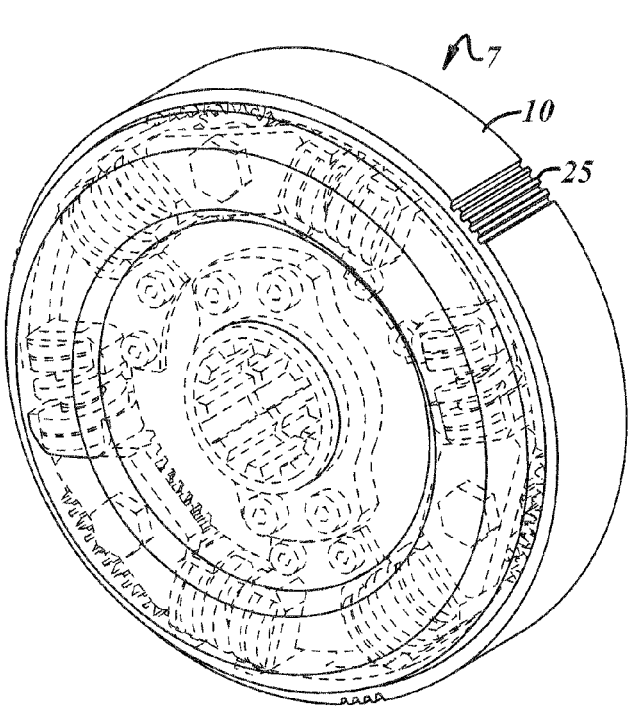 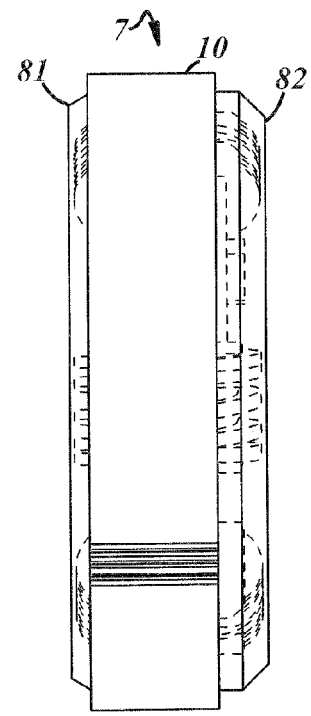
*FIG. 9*     *FIG. 10*
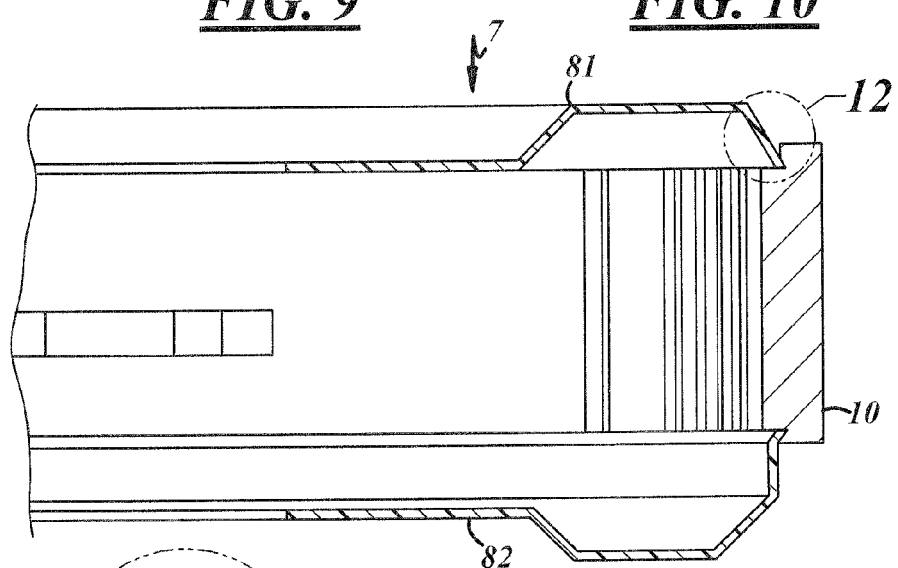
*FIG. 11*
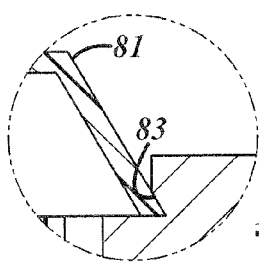
*FIG. 12*

PLANETARY TORSIONAL DAMPER SYSTEM

FIELD OF THE INVENTION

The present invention relates to dampers and dry friction clutches for connecting engines to vehicle drive trains. More particularly, the present invention relates to dampers utilized in dry friction clutches for connecting reciprocating engines to vehicle drivelines.

BACKGROUND OF THE INVENTION

With internal combustion engines, diesel or gasoline, the ignition of fuel in the cylinder causes torsional acceleration, also described as vibrations. Newer commercial diesel engine manufacturers and commercial vehicle manufacturers are configuring vehicles to run at lower and lower engine revolutions per minute (RPM) at highway speeds. Peak torque output of the afore described engines are also being designed at lower engine RPMs. The high torque lower RPM combination for engines causes a need for torsional dampers that are "soft" and have long travel. The "soft" or low rate damper helps dampen drive line torque spikes and also tunes the driveline so that resonant frequencies are lower than the normal operating range of the engine. Accordingly, it is desirable to provide a damper apparatus and method of utilization thereof which achieves low rate damping.

SUMMARY OF THE INVENTION

To help make manifest the above noted desire, a revelation of the present invention is brought forth. The present invention brings forth a damper having a ring gear. A plurality of planet gears is meshed with the ring gear. A sun gear is meshed with the planet gears. The inventive planetary gear damper provides for torsional damping which has long travel and provides low rate damping.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a perspective view of the vehicle damper shown in FIG. 1 with a ring gear cover attached;

FIG. 10 is a side elevational view of the vehicle damper shown in FIG. 9 showing both covers for the ring gear;

FIG. 11 is a partial sectioned enlarged view of the vehicle damper shown in FIG. 10;

FIG. 12 is an enlarged view taken from the encircled area taken from FIG. 11;

DETAILED DESCRIPTION OF THE PREFERRED EMBODIMENTS

Figure 1:
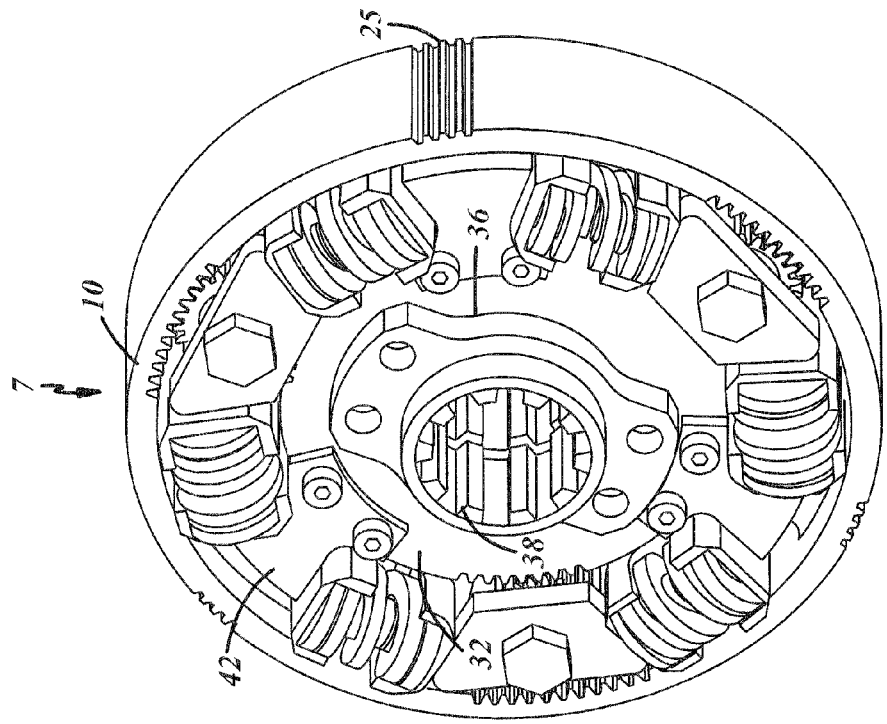
FIG. 1 is a front plan view of a preferred embodiment vehicle damper according to the present invention.
Figure 2:
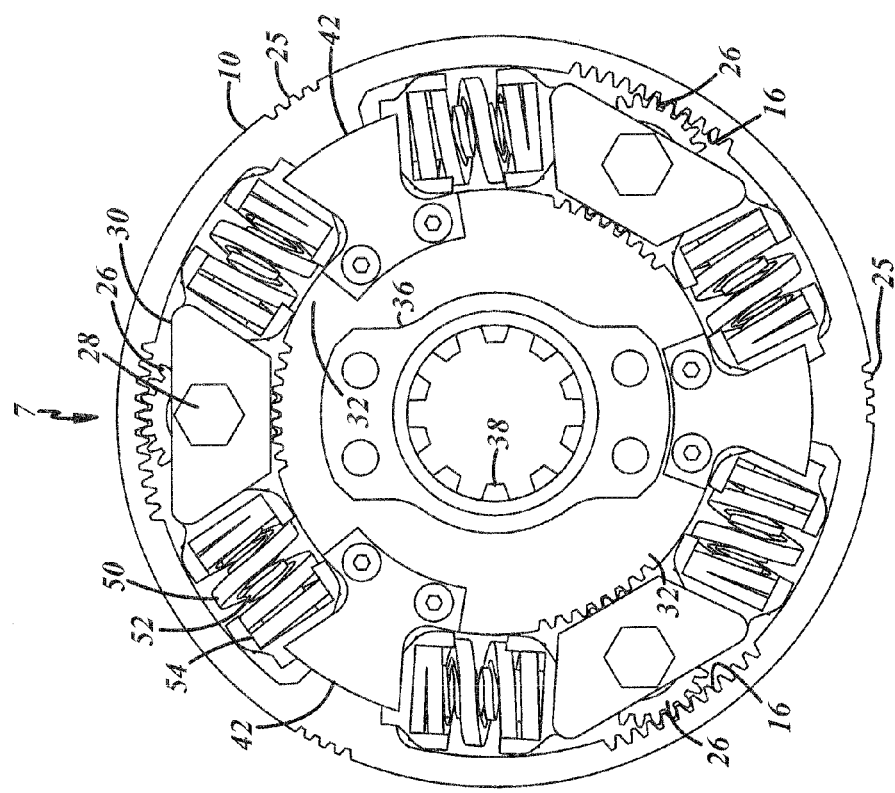
FIG. 2 is a perspective view of the vehicle damper shown in FIG. 1.
Figure 3:
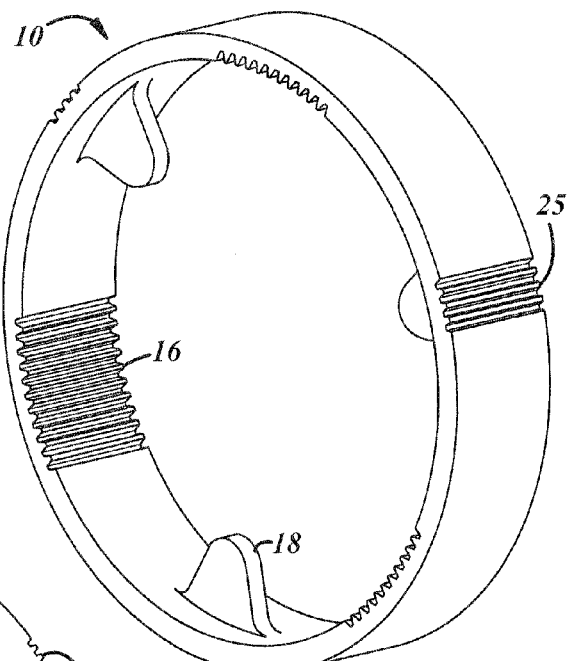
FIG. 3 is a perspective view of a ring gear utilized in the vehicle damper shown in FIG. 1.
Figure 4:
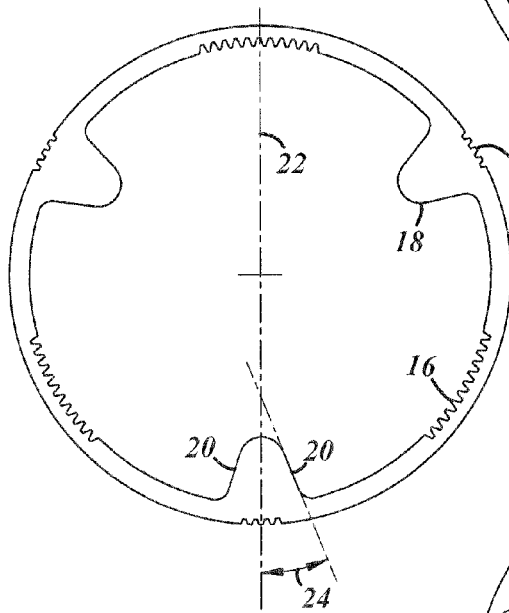
FIG. 4 is a front plan view of the ring gear shown in FIG. 1.
Figure 5:
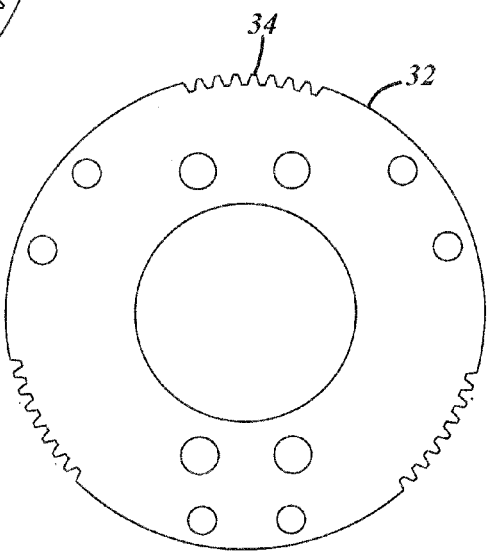
FIG. 5 is a front plan view of a sun gear utilized in the vehicle damper of FIG. 1.

The following description of the preferred embodiment(s) is merely exemplary in nature and is in no way intended to limit the invention, its application, or uses.

Referring to FIGS. 1-5, a vehicle damper 7 according to the present invention has a ring gear 10. The ring gear 10 is typically made from a carbon steel, carbon steel alloy, ductile iron, cast iron or other suitable material. The ring gear is typically in a range of 200 mm to 220 mm diameter with a radial thickness of 6 mm although other dimensions may be suitable in other applications. Along its outer peripheral diameter, the ring gear has a series of geometrically spaced spline teeth 25 to allow for sliding axial connection with a friction disc 14 (see FIGS. 13-17). The friction disc 14 is utilized in a manner to be described to provide a torsional input to the ring gear 10 from an engine, typically a reciprocating piston diesel or gasoline truck or large vehicle engine (not shown). The ring gear 10 along its inner diameter has three geometrically spaced gear teeth areas 16. The gear teeth 16 are typically involute gear teeth. The ring gear also has along its inner diameter three geometrically spaced drive tangs 18. The drive tangs 18 have generally straight drive surfaces 20 at angle 24. Angle 24 is typically between 20 and 30 degrees from a diametric centerline 22.

Figure 6:
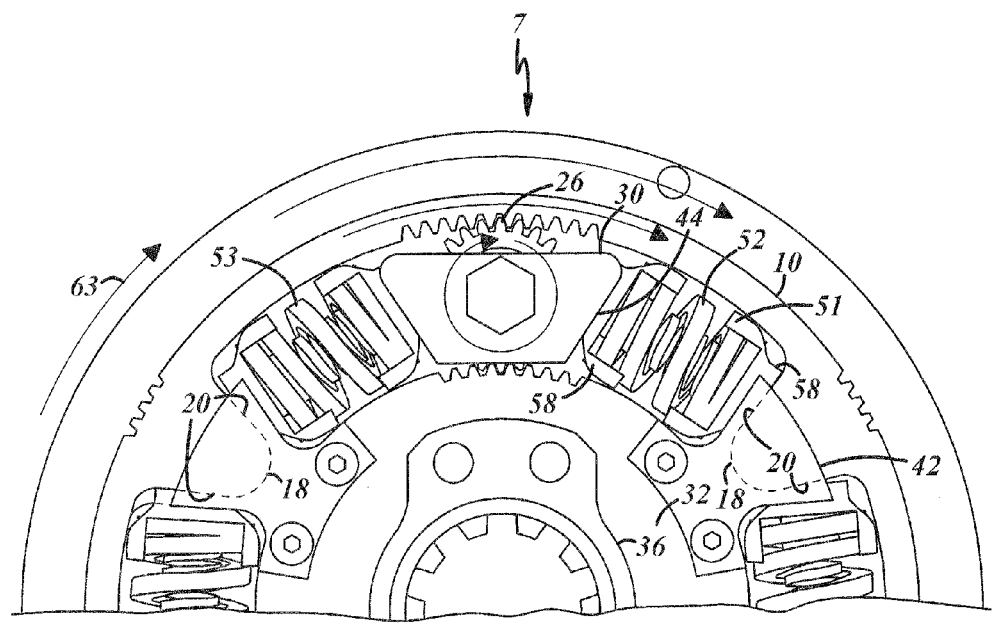
FIG. 6 is an enlarged partial front plan view illustrating operation of the vehicle damper shown in FIG. 1.
Figure 7:
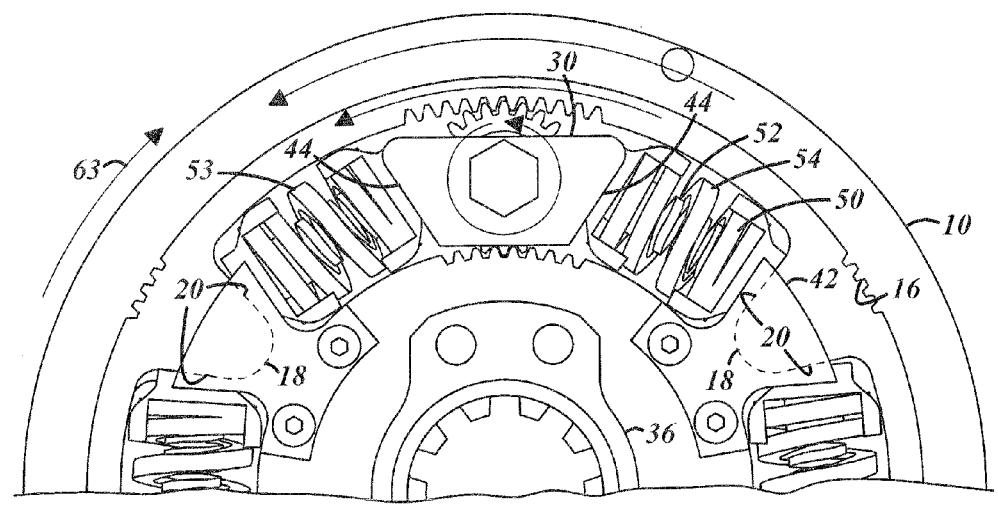
FIG. 7 is an operational view similar to that of FIG. 6.
Figure 8:
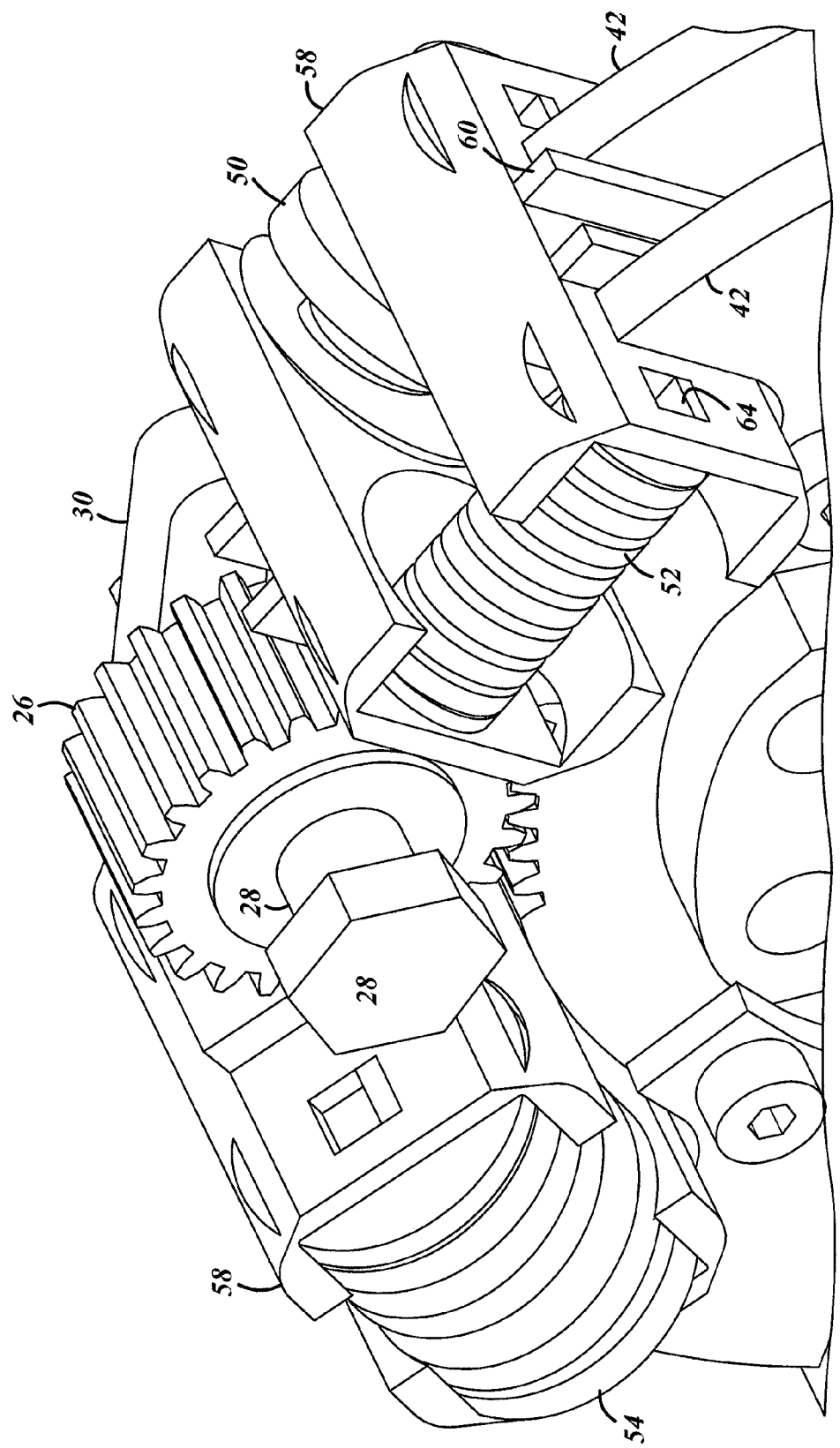
FIG. 8 is an enlarged perspective view with some elements removed for clarity of illustration of the vehicle damper shown in FIG. 1.
Figure 13:
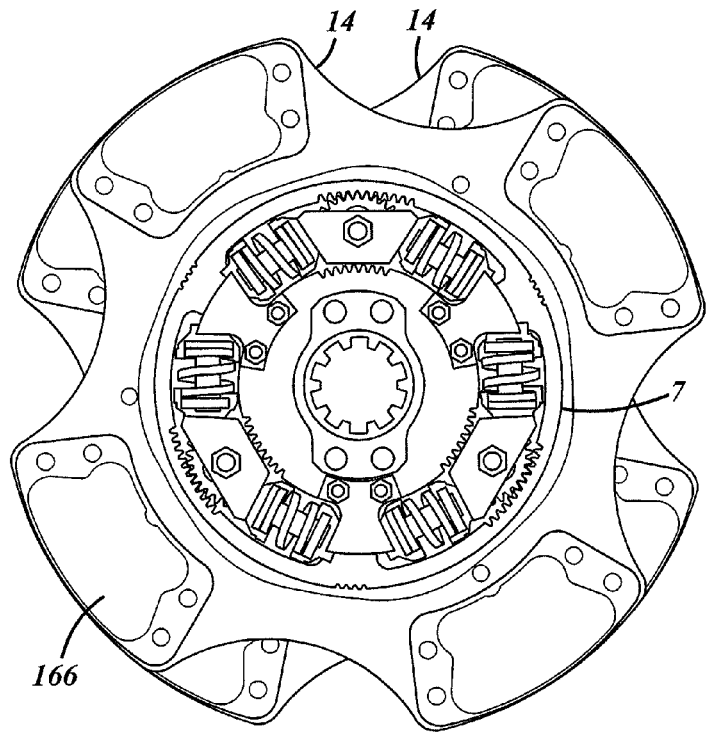
FIG. 13 is front elevational views of the vehicle damper shown in FIG. 1 with both friction discs attached thereto.
Figure 14:
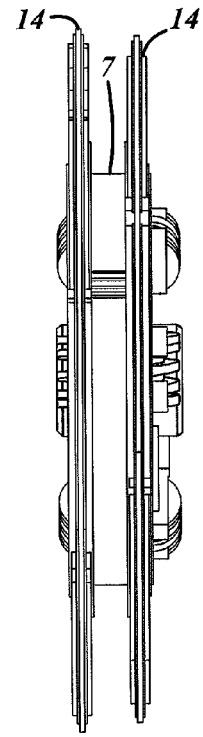
FIG. 14 is a side elevational view of the vehicle damper shown in FIG. 13.
Figure 15:
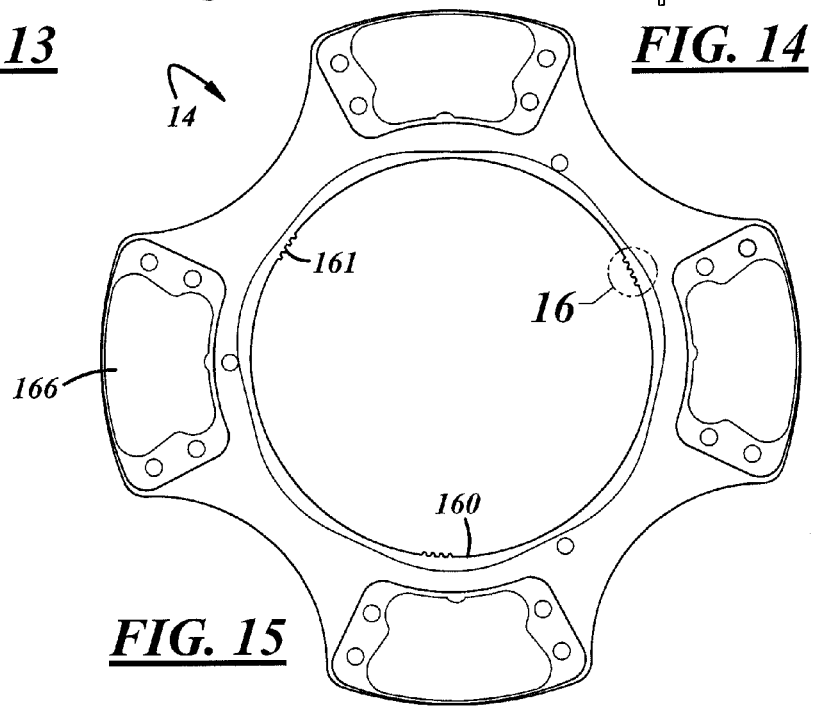
FIG. 15 is a front elevational view of the friction disc shown in FIG. 13 with the vehicle damper removed.
Figure 16:
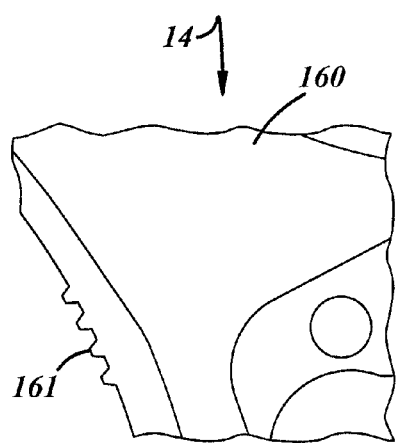
FIG. 16 is an enlargement of a portion of the friction disc shown in FIG. 15.
Figure 17:
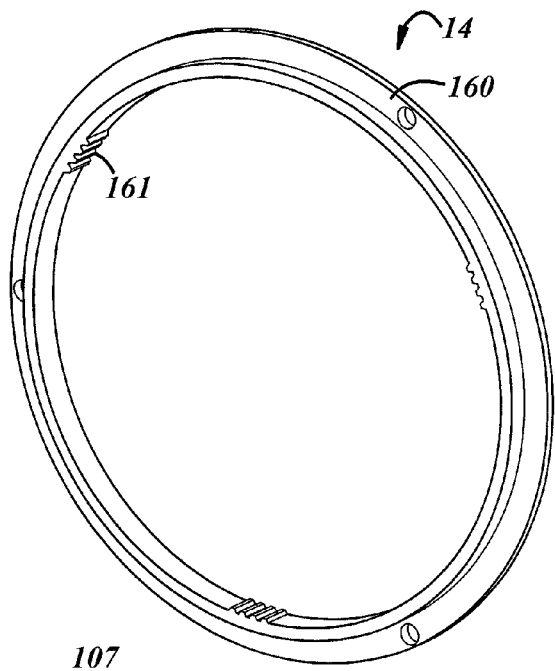
FIG. 17 is a perspective view of a rim portion of the friction disc shown in FIG. 15.
Figure 18:
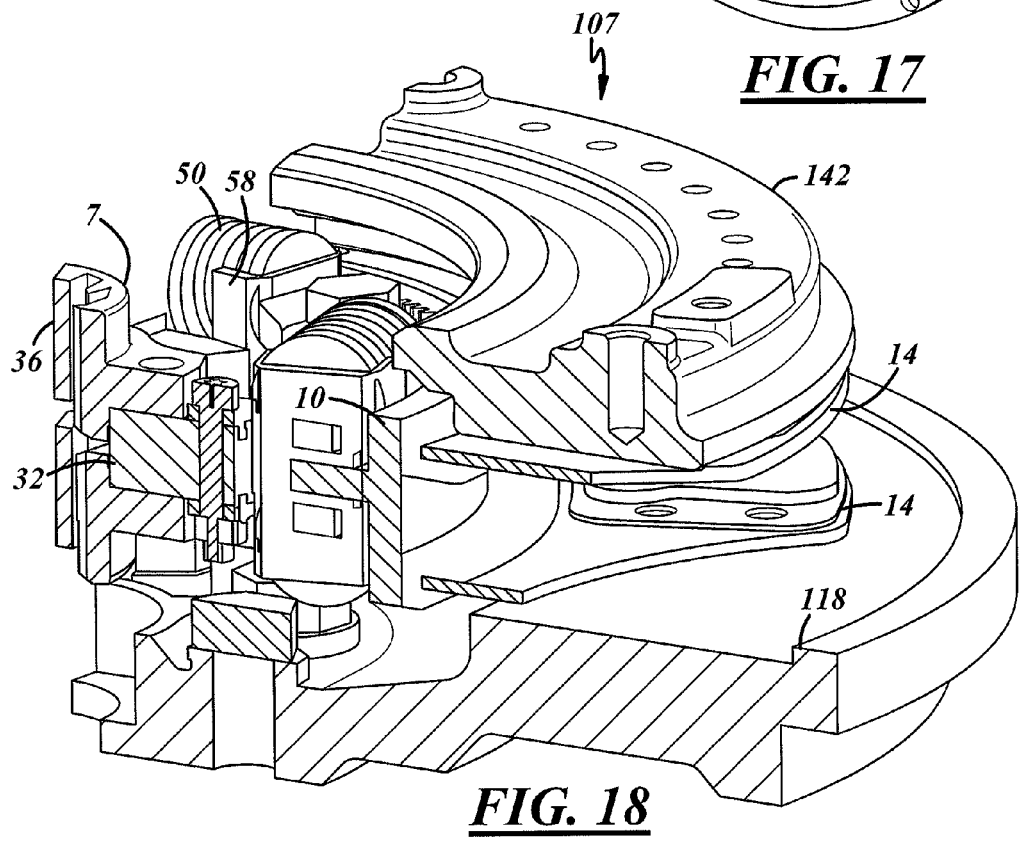
FIG. 18 is a partially sectioned view of the vehicle damper according to the present invention utilized in a vehicle clutch (the clutch cover and ring gear covers and intermediate plate being removed for clarity of illustration)
Figure 19:
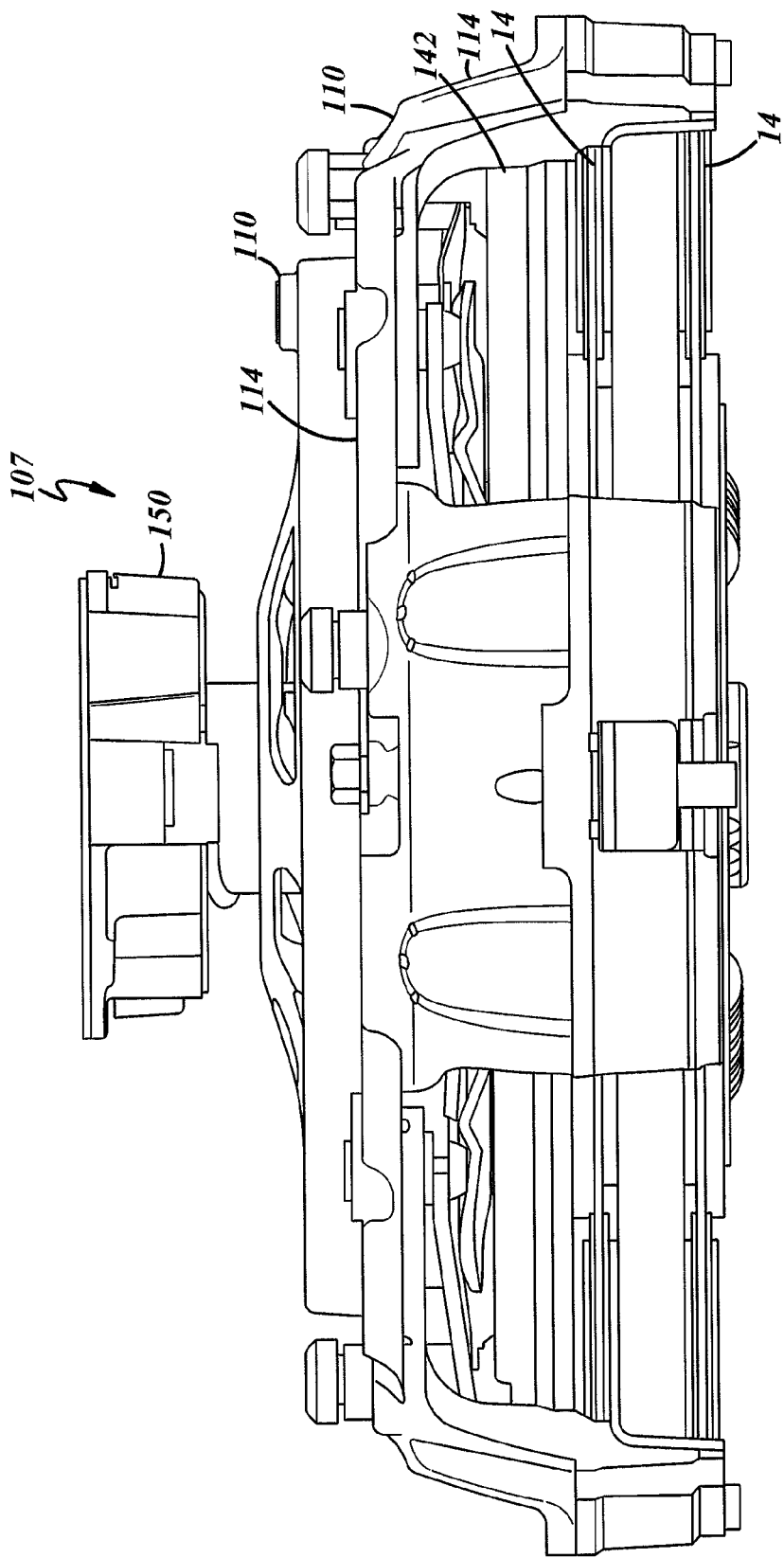
FIG. 19 is a side elevational view partially sectioned of the vehicle clutch shown in FIG. 18 (shown without an engine flywheel)
Figure 20:
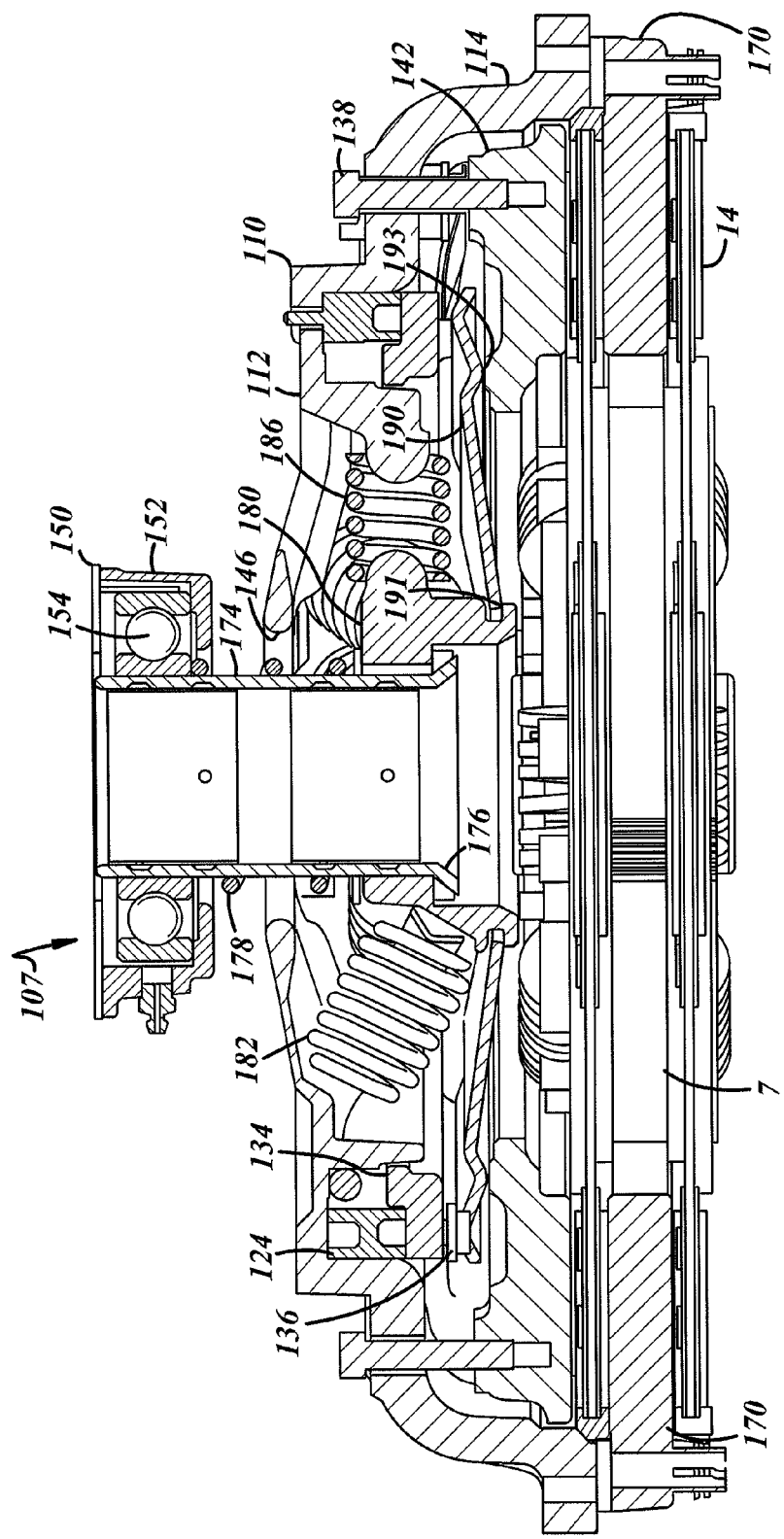
FIG. 20 is a side elevational view of the vehicle clutch with the vehicle damper (without the ring covers) installed according to the present invention.
Figure 21:
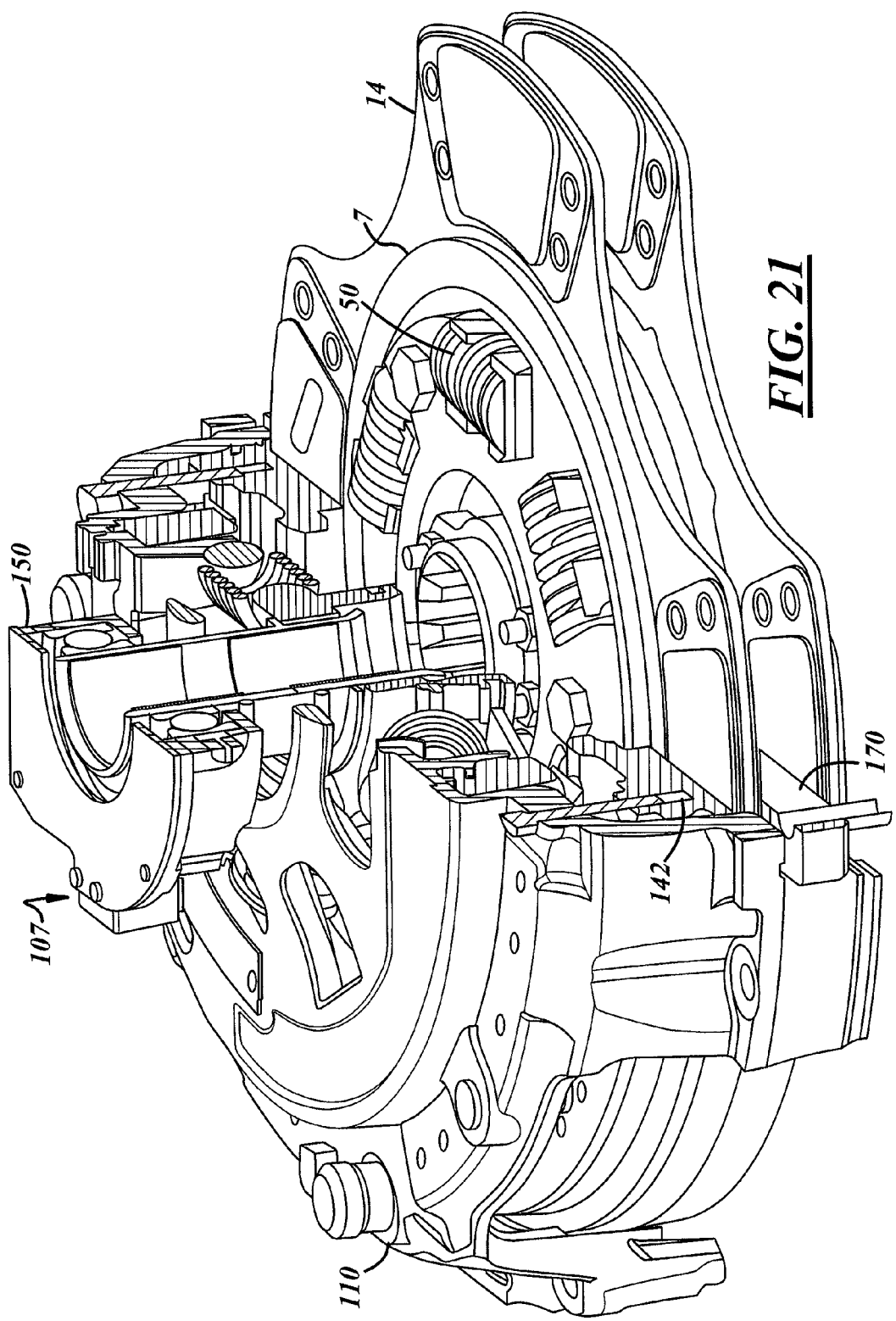
FIG. 21 is a perspective view partially sectioned of the vehicle clutch shown in FIG. 20.
Figure 22:
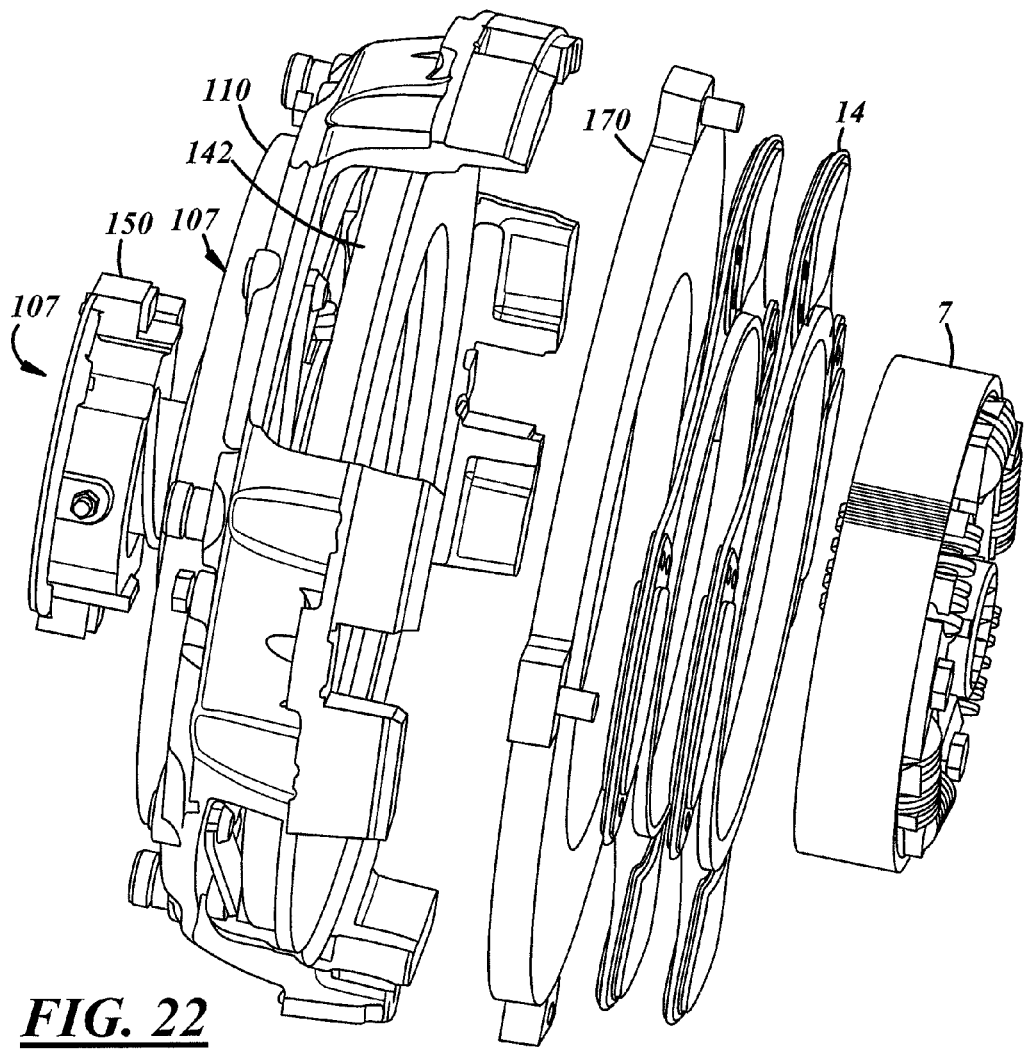
FIG. 22 is an exploded view of the major components of the vehicle clutch of FIG. 18 with an intermediate plate shown out of position for purposes of illustration.

Referring additionally to FIGS. 6, 7 and 8, meshed with the gear teeth 16 of the ring gear 10 is a plurality of planet gears 26. Typically, there are at least two and preferably 3 planet gears, however, in other applications; even more planet gears can be utilized. Connected with the planet gear is a carrier shaft 28 which typically the planet gear 26 rotates about. The carrier shaft 28 is provided by a bolt. Connected with the bolt 28 are two axially spaced planet gear blocks 30. The carrier shafts 28 in the example shown are independent of one another but in another embodiment not shown, they may be connected with a common structure. Planet gear 26 is meshed with a sun gear 32. The sun gear 32 has three geometrically spaced gear portions 34. Boltably connected to both sides of the sun gear 32 are hubs 36 which provides splined inner diameter 38 for sliding axial connection and torsional output to the drive line of the vehicle (typically a truck, not shown) which typically is provided by a transmission input shaft. Boltably connected to the sun gear 32 are radially outwardly projecting driven parallel aligned axially spaced tangs 42. In another embodiment (not shown), the sun gear 32, hubs 36 and tangs 42 are provided by casting.

The planet gear block 30 has a drive surface 44. Arcuately captured between the drive surfaces 44 of the planet gear blocks 30 and the driven tang 42 of the sun gear 32 is a four compression spring compliance member 50. The spring compliance member 50 has two axially spaced parallel spring modules, each spring module having an inner spring 52 encircled by an outer spring 54 (one of the outer springs in FIG. 8 being removed for clarity of illustration). The spring modules are, at their extreme ends, arcuately captured by spring brackets 58. Spring brackets 58 have two parallel spaced axial alignment members 60. The alignment members 60 allow the spring brackets 58 to be axially restrained by the sun gear driven tangs 42 and are spaced apart to allow for alignment and receipt of the drive tangs 18 of the ring gear in a manner to be described. The brackets 58 have punched out tabs 64 that act as mounts for the springs 52.

As mentioned previously, the ring gear 10 receives a torsional input from the reciprocating piston engine driving the driveline of the transmission which is connected with the driveline of the vehicle which is typically the transmission input shaft via the sun gear 32. Accordingly, there is relative annular movement or displacement of the ring gear 10 with respect to the sun gear 32 and this relative movement is alternating even though there is a constant direction of travel noted by arrow 63. In a first range of angular displacement of the ring gear 10 with respect to the sun gear 32, a first alternating set 51 of three of the six spring compliance members 50 are arcuately captured between the planet gear block 30 and the sun gear driven tang 42. The planet gears 26 rotate in a clockwise fashion causing the planet gear block 30 to move rightward with respect to a second set 53 of compliance members. During this initial phase of (clockwise FIG. 6) relative angular rightward displacement of the ring gear 10 with respect to the sun gear 32, the drive surfaces 20 of the ring gear do not contact either of the spring compliance members 50 to the right or to the left of the planet gear block 30 as shown in FIG. 6. As the ring gear is continually displaced to the right, the spring compliance member 51 shown in FIG. 6 to the right is compressed by the sun gear driven tang 42 via contact with the spring bracket 58 and the planet gear block 30. Spring compliance member 51 restrains relative angular movement between the sun gear and the planet gear, thereby dampening relative angular displacement between the ring gear and the sun gear. However, as there is an increased range of displacement of the ring gear 10 with respect to the planet gear 32, drive tang 18 is displaced rightward to contact the second set of spring compliance members designated as 53 in FIG. 6. Spring compliance member 53 restrains relative angular movement between the ring gear and the planet gear thereby dampening relative angular displacement between the ring gear and sun gear. Both spring compliance members 53 and 51 are now resistive of further relative movement to the right of the ring gear 10 with respect to the sun gear 32. This period of time when both spring compliance members 52, 51 are being compressed provides a second rate or a doubling of the spring constant in most applications. Due to the reciprocal nature of the reciprocating piston engine, as shown in FIG. 7, the ring gear 10 starts to move in an opposite or counterclockwise with respect to the sun gear 32. Such movement causes the ring gear drive tang 18 to move counterclockwise with respect to the spring compliance members 53 causing the left spring bracket 58 of the spring compliance member 53 to again rest upon the driven tang 42 of the sun gear. The right side of spring compliance member 53 is now compressed by the planet gear block 30. The planet gear 26 rotates counterclockwise. Further, counterclockwise movement of the ring gear 10 with respect to the sun gear 32 causes the drive tang 18 of the ring gear to the right of spring compliance member 51 to engage the right spring bracket 58 and displace it from its rested position upon the sun gear driven tang 42 and now further leftward movement of the ring gear 10 with respect to the sun gear 32 causes both spring compliance members 53 and 51 to be compressed providing a second spring rate of increased resistance to further angular displacement of the ring gear 10 with respect to the sun gear 32. Upon the maximum amount of relative angular displacement of the ring gear 10 to the left with respect to the sun gear 32, the ring gear 10 starts moving to the right with respect of the sun gear 32 causing the drive tang 18 on the right side of the spring compliance member 51 to be removed from engagement with the spring bracket 58 and for the spring bracket 58 to therefore rest upon the sun gear driven tang 42 and the spring compliance member 53 is decompressed and a new cycle of relative angular displacement of the ring gear 10 with respect to the sun gear 32 commences. The movement of the drive tangs 18 with respect to the brackets 58 is aligned by the bracket guides 60 and is held axially there between.

Referring to FIGS. 9-12, the damper 7 is also provided with front and rear dust covers 81 and 82. The dust covers 81 and 82 also hold in lubricants utilized for the damper 7. The ring gear, as best shown in FIG. 12, has an angled step 83 to allow for snap in engagement of the dust covers 81 and 82. The dust covers 81 and 82 allow the spring modules protected from entry of foreign matter that may occur due to the environment or to the generation of particles from the friction engaging discs 14.

Further refinements can be made to damper 7 in order to vary the amount of damping which occurs versus the range of relative displacement between the ring gear 10 and the sung gear 32. To further vary the damping relationship to relative displacement, the spring compliance members can be made to be dual rate springs in and of themselves by utilizing inner and outer springs of different lengths therefore causing one of the springs 52 or 54 to be engaged before the other spring. Additionally, the travel of the planet gear 28 can be caused to be made asymmetrical by causing the spring constant of three circumferentially alternating spring compliance members 51 to be "softer" having a different spring constant than a "harder" spring constant of the second set of spring members 53 (given the same torque). This arrangement can cause an asymmetric movement of the planet gear to be displaced in a greater manner to the right versus as to the left as shown in FIGS. 6 and 7.

Referring additionally to FIGS. 18-22, a selectively enagageable dry friction lever applied reverse pull clutch assembly 107 used with a damper 7 of the present invention has a clutch cover 110. The clutch cover 110 has a main body 112 and a rim 114. The clutch cover 110 is torsionally connected by a series of threaded fasteners (not shown) with an engine flywheel 118 (only shown in FIG. 18) thereby torsionally connecting the clutch cover 110 with the flywheel 118. The flywheel 118 is torsionally connected to an output shaft (not shown) of a reciprocating piston vehicle engine. The cover rim 114 allows the clutch cover main body 112 to be axially spaced from the flywheel 118.

Clutch assembly 107 as illustrated incorporates an optional adjustment mechanism. The adjustment mechanism includes a cam ring 124. The cam ring 124 interacts with an adjusting ring 134 to axially move the adjusting ring 134 to compensate for clutch ware.

The clutch cover main body 112 receives several pins 138 which are part of the optional adjustment mechanism. The pins 138 project into apertures of an annular shaped pressure plate 142. The pins 138 may be used to connect straps to pressure plate 142, which are in turn connected with the clutch cover 110. The pins 138 and straps provide the torsional connection of the pressure plate with the cover 110 and allow the pressure plate 142 to be axially moveable. Straps are also provided to torsionally connect the adjustment plate 134 with the pressure plate 142.

The cover 110 has an aperture 146. Extending through the aperture 146 is a release assembly 150. The release assembly 150 includes a pull assembly 152. The pull assembly 152 provides a structure to allow a shift yoke (not shown) to grab the release assembly 150 and pull it in a direction away from the pressure plate 142. The release assembly pull assembly 152 has mounted inside a bearing 154. The bearing 154 allows the pull assembly 152 to be rotatively fixed with respect to a clutch housing (not shown) connecting an engine block to a transmission housing (not shown). An outer race of the bearing is rotatively fixed to an outer housing or portion of release assembly 150 engaged by the shift yoke. An inner race of the bearing is rotatively fixed to a rotating sleeve 174. When the clutch assembly is installed in the vehicle, sleeve 174 is disposed over an independently rotating transmission input shaft (not shown).

Each friction disc 14 (FIGS. 13-17) has a splined inner hub 160 with spline teeth 161 which allows the friction disc to be axially moveable on the ring gear 10 thereby having a torsional connection with the transmission input shaft (not shown) via the damper 7. The splined connection of the friction discs with the damper ring gear 10 to allow for the absorption of torque spikes due to the reciprocating piston nature of the vehicle engine. The outer portion of the friction discs has a plurality of friction pads 166 on both their front and rear axial facing.

Juxtaposing the friction discs 14 is an intermediate plate 170 enabling the use of a second friction disc 14. The intermediate plate 170 has a series of lugs which project into slots provided in the cover 110 causing torsional connection of intermediate plate to the cover 110 while still allowing the intermediate plate to be axially moveable with respect to the flywheel 118 and the cover 110.

Referring back to the release assembly 150, the pull assembly 152 has connected thereto the sleeve 174. The sleeve 174 has a flared portion 176. Encircling the sleeve 174 is a coil spring 178. The coil spring 178 spring loads and allows for axial sliding movement between the pull assembly 152 and another portion of the release assembly referred to as the spring retainer 180.

The spring retainer 180 mounts six actuator coil springs 182 that are captured between the cover main portion 112 and the spring retainer 180. The actions of the springs 182 urge the spring retainer 180 in a direction towards the pressure plate 142. The spring retainer 180 also mounts three geometrically spaced springs 186 to provide assistance in releasing the clutch.

To transmit motion from the release assembly 150 to the pressure plate 142, there is provided at least three, and in most instances five or six apply levers 190. The apply levers 190 have a radial inner end 191 having a radially inner first sliding pivotal engagement with the spring retainer 180. Each lever 190 also has a bend portion 193 with intermediate second sliding pivotal engagement with the pressure plate 142. Additionally, each lever has a third pivotal engagement with respect to the clutch cover 110 (via the adjusting plate 134). To selectively torsionally connect the engine of the vehicle with the input shaft of the transmission, the coil springs 182 bias the spring retainer 180 towards the pressure plate 142 causing the levers 190 to have their radial inner end 191 to be pushed towards the pressure plate 142 causing the bend portion 193 of the levers to push the pressure plate 142 towards the flywheel 118 as the levers pivot about adjacent their outer radial end in the pivot extension 136. The above noted action moves the pressure plate 142, causing the friction discs 14 to be captured with the flywheel 118, pressure plate 142 and intermediate plate 170. The capture of the friction discs 14 with the flywheel 118 and pressure plate 142 and intermediate plate 170 causes the torque output of the engine output shaft (not shown) to be transferred to the transmission input shaft (not shown). To allow for transmission gear shift changes, the clutch assembly 107 is released by the yoke (not shown) pulling back on the pull assembly 152 causing the sleeve flared portion 176 to engage with the spring retainer 180 pulling back the inner most radial ends 191 of the levers 190 and thereby relieving the bend portion 193 of the levers from the pressure plate 142, thereby allowing the friction discs 14 to be released from the pressure plate 142, intermediate plate 170, and flywheel 118. The clutch assembly 107 is in a dry (non-liquid lubricating oil) environment and operation of the clutch 107 in normal utilization generates large amounts of heat wherein the only cooling available is that achieved through the clutch assembly 107 spinning through the air.

Figure 23:
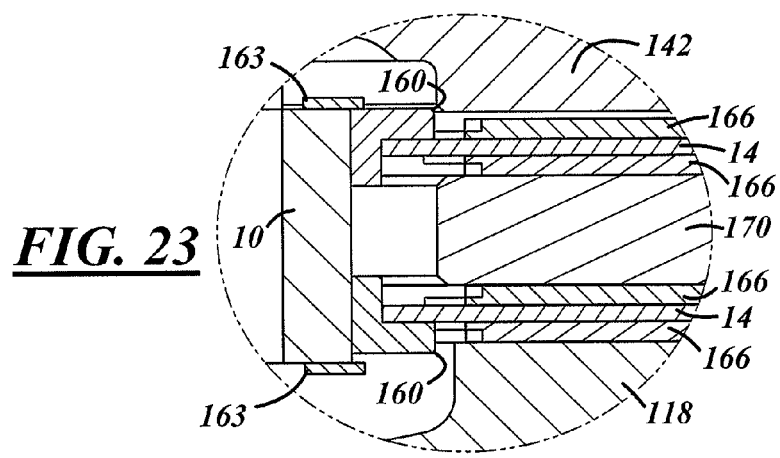
FIG. 23 is a partial sectional view of a vehicle clutch shown in FIG. 18 with the intermediate plate inserted therein illustrating a method of axial restraint of the ring gear and damper within the clutch assembly.

Referring to FIG. 23, a partial sectional view of the clutch assembly 107 illustrates how the damper 7 is axially restrained. The ring gear 10 on its axial extreme ends has axial retainers 163. The axial retainer 163 be of various types but is typically a plurality of geometrically spaced retainers that are attached to the ring gear 10 by a fastener (not shown). The retainer 163 extends radially outward from an outer radial surface of the ring gear 10. As mentioned previously, on either axial face, the friction discs 14 have friction pads 166 which wear over process of time. The friction discs 14 also have an inner hub 160 that is axially slidable on the ring gear 10. In a direction towards the flywheel 118, the ring gear 10 is axially restrained by contact of the retainer(163) 163 with the inner hub 160 of the friction disc 14 positioned between the pressure plate 142 and the intermediate plate 170. In an opposite axial direction the ring gear 10 and damper 7 is axially restrained within the clutch assembly 107 by contact of the retainer(s) 163 with the rim 160 of the friction disc 14 that is positioned between the flywheel 118 and the intermediate plate 170. Thus, the damper 10 is axially restrained with respect to both of the friction discs 14. This restraint occurs even with both friction discs 14 generally being axially unrestrained with respect to the ring gear 10 with the limit of that being the intermediate plate 170.

The description of the invention is merely exemplary in nature and, thus, variations that do not depart from the gist of the invention are intended to be within the scope of the inven-

What is claimed is:

1. A vehicle damper for reducing torsional vibration from an engine to a vehicle driveline comprising:
   a ring gear having a torsional input connection with the engine;
   a plurality of planet gears in mesh with said ring gear;
   a sun gear meshed with said planet gears, said sun gear having a torsional output connection to the vehicle driveline;
   at least one first spring member having a position arcuately captured between said sun gear and one of said planet gears to torsionally dampen relative angular displacement between said ring gear and said sun gear by restraining relative angular movement between said sun gear and said planet gear; and
   at least one second spring member having a position arcuately captured between one of said planet gears and said ring gear to torsionally dampen relative angular displacement between said ring gear and said sun gear by restraining relative angular movement between said ring gear and said planet gear.

2. The damper of claim 1 wherein one of said first and second spring members is compressed during a first range of relative angular displacement between said ring gear and said sun gear, and upon a second range of increased relative angular displacement between said ring gear and said sun gear, said other one of said first and second spring members is compressed.

3. The damper of claim 2 wherein in said second range of angular displacement between said ring gear and said sun gear both of said first and second spring members are compressed.

4. The damper of claim 2 wherein one of said first and second spring members has a multiple spring constant.

5. The damper as of claim 2 wherein said first and second spring members have different spring constants.

6. The damper as of claim 2 wherein one of said first and second spring members has a position between one of said planet gears and one of said sun gear and said ring gear in one range of relative angular displacement between said ring gear and said sun gear, and wherein said one spring member has a position between one of said planet gears and said other of said ring gear or sun gear in said second range of relative angular displacement between said ring gear and said sun gear.

7. The damper of claim 6 wherein both of said first and second spring members are captured between one of said planet gears and said sun gear when said ring gear is within said first range of relative angular displacement between ring gear and said sun gear, and wherein in said second increased range of relative angular displacement between said ring gear and said sun gear, said second spring member is captured between said ring gear and said one of planet gears.

8. The damper of claim 7 wherein said sun gear has parallel axially spaced apart driven tangs and each of said spring members have brackets with axial alignment members axially captured by respective driven tangs of said driven tangs and wherein said ring gear has radially inwardly projecting drive tangs engaging respective spring brackets of said spring brackets between said respective axial alignment members.

9. The damper of claim 1 wherein said ring gear is connected to a friction disc.

10. The damper of claim 9 wherein said friction disc is axially slidable upon said ring gear.

11. The damper of claim 10 wherein said friction disc is one of a plurality of friction discs connected to said ring gear.

12. The damper of claim 1 wherein said planet gears have independent carriers.

13. The damper of claim 1 wherein each of said planet gears has a respective carrier connected with a respective block, each of said blocks making contact with one of said sun gear and said ring gears.

14. The damper of in claim 1 wherein one of said spring members has an end mounted with a bracket.

15. The damper of claim 1 wherein at least one of said first and second spring members include dual springs in parallel with one another.

16. The damper of claim 1 having a cover for said ring gear.

17. A vehicle damper for reducing torsional vibration from an engine to a vehicle driveline comprising:
   a ring gear for receiving a torsional input from an engine, said ring gear having a plurality of radially inward projecting drive tangs;
   a plurality of planet gears in mesh with said ring gear, each of said planet gears having a carrier shaft with a respective block connected to said respective carrier shaft;
   a sun gear meshed with said planet gears to provide torsional output to a vehicle driveline, said sun gear having axially aligned and spaced apart driven tangs;
   a set of first spring members, said first spring members extending between respective spring brackets and each of said first spring members' spring brackets being arcuately captured between a respective one of said planet gear blocks and a respective one of said sun gear driven tangs to provide torsional damping of relative angular displacement between said ring gear and said sun gear in a first angular range of displacement between said ring gear and said sun gear in a first direction; and
   a set of second spring members, said second spring members extending between respective spring brackets and each of said second spring members' brackets being arcuately captured between a respective one of said planet gear blocks and a respective one of said sun gear driven tangs to provide; providing torsional damping of relative angular displacement between said ring gear and said sun gear in a second direction counter to said first direction, and wherein in a second increased range of relative angular displacement between said ring gear and said sun gear in said first direction, each of said second spring members' brackets are arcuately captured between a respective one of said ring gear drive tangs and a respective one of said planet gear blocks, and wherein in a second increased range of relative angular displacement between said ring gear and said sun gear in said second direction opposite said first direction each of said first spring members' brackets are in a position arcuately captured between a respective one of said planet gear blocks and a respective one of said drive tangs of said ring gear.

18. A method for damping torsional vibration from an engine to a vehicle driveline comprising:
   receiving a torsional input from the engine by one of a ring gear and sun gear;
   meshing a plurality of planet gears with said ring gear;
   meshing said other one of said ring gear and said sun gear with said planet gears to provide torsional output to the vehicle driveline;
   arcuately capturing between said sun gear and one of said planet gears at least one first spring member to provide torsional damping of relative angular displacement between said ring gear and said sun gear; and arcuately capturing between one of said planet gears and said ring gear at least one second spring member to providing torsional damping of relative angular displacement between said ring gear and said sun gear.

19. The method of claim 18 comprising compressing one of said first and second spring members during a first range of angular displacement between said ring gear and said sun gear and upon a second range of increased angular displacement between said ring gear and said sun gear compressing said other of said first and second spring members in addition.

20. A selectively engageable dry friction clutch assembly for connecting a vehicle transmission with a flywheel of an engine comprising:
- a clutch cover having a main body axially spaced from said flywheel and being torsionally connected to said flywheel;
- an axially movable pressure plate assembly tosionally connected with said clutch cover;
- a damper for torsional connection with a shaft torsionally connected with said vehicle transmission, said damper having a ring gear, said ring gear on an outer peripheral surface having spline teeth, a plurality of planet gears meshed with said ring gear, a sun gear meshed with said planet gears having a torsional connection with said vehicle transmission, and said damper including at least one spring member arcuately captured between one of said sun gear and ring gear and one of said planet gears to provide torsional damping;
- first and second friction discs having sliding axial torsional connection with said damper via said ring gear spline teeth, said friction discs being axially positioned between said flywheel and said pressure plate;
- an axially movable intermediate plate juxtaposing said friction discs being torsionally connected with respect to said clutch cover; and
- a release assembly for releasing said pressure plate toward said flywheel.

21. The clutch assembly of claim 20 wherein the ring gear has retainers and wherein said damper is axially restrained in a first direction by said first friction disc and by said second friction disc in an opposite direction.

* * * * *